Jan. 22, 1963
R. I. E. MARD ETAL 3,074,110
METHOD OF AND APPARATUS FOR FORMING A DOUBLE-WALLED
RECEPTACLE FROM THERMOPLASTIC SHEETING
Filed May 24, 1960
FIG.1
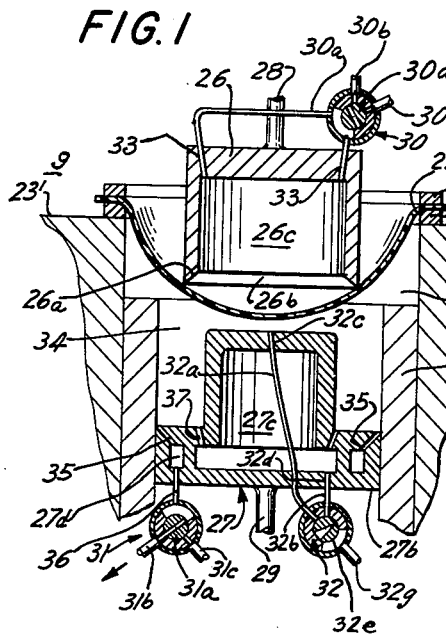
FIG.2
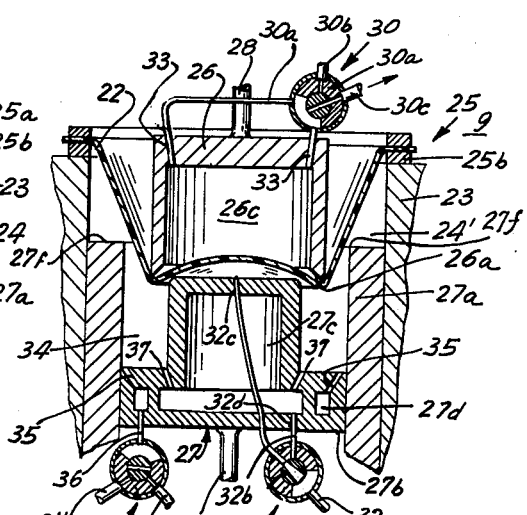
FIG.3
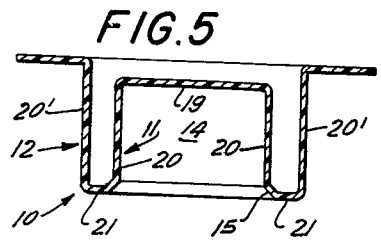
FIG.5
FIG.4
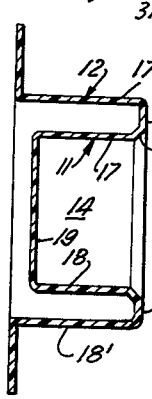
FIG.6
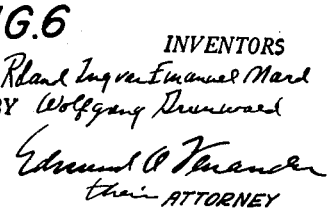
INVENTORS
Roland Ingvar Emanuel Mard
Wolfgang Drenward
BY
Edmund A. Verander
their ATTORNEY United States Patent Office 3,074,110
Patented Jan. 22, 1963

3,074,110
METHOD OF AND APPARATUS FOR FORMING A DOUBLE-WALLED RECEPTACLE FROM THERMOPLASTIC SHEETING
Roland Ingvar Emanuel Mard, Vallingby, and Wolfgang Grunwald, Enebyberg, Sweden, assignors to Aktiebolaget Electrolux, Stockholm, Sweden, a corporation of Sweden
Filed May 24, 1960, Ser. No. 31,406
Claims priority, application Sweden May 26, 1959
8 Claims. (Cl. 18—19)

Our invention relates to a method of and apparatus for forming a double-walled receptacle from a sheet of thermoplastic material.

It is an object of the invention to provide an improved method of and apparatus for forming from a sheet of thermoplastic material heated to an elevated softening temperature a double-walled receptacle including an inner liner defining a space having a closed end and walls extending therefrom toward an opening and an outer shell having walls which are spaced from the liner walls and a wall about the opening connecting the walls of the liner and outer shell.

The novel features we believe to be characteristic of out invention are set forth with particularity in the claims. The invention, both as to organization and method, together with the above and other objects and advantages thereof, will be better understood by reference to the following description taken in connection with the accompanying drawing forming a part of this specification, of which:

FIG. 1 is a vertical sectional view of apparatus for forming a double-walled receptacle in accordance with the invention;

FIGS. 2, 3 and 4 are sectional views illustrating parts of the apparatus having relative positions different from the relative positions shown in FIG. 1;

FIG. 5 is a horizontal sectional view of a receptacle formed in accordance with the invention; and FIG. 6 is a vertical sectional view of the receptacle shown in FIG. 5.

Referring to FIGS. 5 and 6, the invention is shown in connection with a refrigerator cabinet 10 having an inner liner 11 disposed within an outer shell 12 and insulated therefrom in any suitable manner (not shown). The inner liner 11 defines a thermally insulated storage space 14 having an opening 15, access to the storage space 14 being afforded by a door (not shown) which may be pivotally mounted in position in any suitable manner. The storage space 14 is arranged to be cooled by a cooling element or evaporator (not shown).

In the embodiment of FIGS. 5 and 6, the top wall 17, bottom wall 18, rear wall 19 and lateral side walls 20 of the storage space 14 are formed by the inner liner 11. The top wall 17′, bottom wall 18′ and lateral side walls 20′ of the cabinet 10 are formed by the outer shell 12. The forward edges of the inner liner 11 and outer shell 12 are connected by a front section 21 which extends about the opening 15 and forms the front wall of the cabinet 10. The inner liner 11 and outer shell 12 and front connecting wall 21 are formed from a sheet 22 of suitable thermoplastic material, such as polystyrene, for example.

In accordance with our invention, the cabinet 10 may be formed from the thermoplastic sheet 22 in several steps with the aid of apparatus 9 like that shown in FIGS. 1 to 4. The apparatus 9 for forming the cabinet 10 includes a support 23 having a vertically disposed opening 24 and about the top edge 23′ of which is adapted to be fixed in any suitable manner a hollow frame 25 having top and bottom parts 25a and 25b, respectively, between which the thermoplastic sheet 22 is adapted to be clamped.

The apparatus 9 includes cooperating top and bottom members 26 and 27, each of which is vertically movable in the opening 24. Vertical movement is imparted by a rod 28 to the top member 26 which is rectangular in horizontal section and of inverted cup shape. The bottom edge 26a of the member 26 is tapered at the opening 26b of the cavity or space 26c therein. Vertical movement is imparted by a rod 29 to the bottom member 27 which includes an outer section 27a and an inner section 27b. The outer section 27a is in the form of a hollow sleeve which snugly fits within the opening 24 and is slidable therein. The inner section 27b includes a base portion joined at its periphery to the outer section 27a and a narrower upright portion which is adapted to nest within the hollow top member 26, as shown in FIG. 3. The base and upright portions of the inner section 27b are hollow to provide a main space 27c. Further, the base portion of the inner section 27b is formed with a channel or space 27d disposed about the bottom part of the main space 27c.

The apparatus 9 is provided with three valves 30, 31 and 32. Valve 30 is connected by conduits 30a, two of which are shown, to channels 33 formed in the upper portions of the top member 26 at its closed end. Valve 30 includes an apertured part 30a which is rotatable so that channels 33 may be closed by such part or placed in communication with a conduit 30b which is connected to a source of suction or with a conduit 30c which is open to the atmosphere.

The annular space 27d in member 27 is connected by channels 35 with regions of space 34 at which the periphery of the base portion of inner section 27b joins the outer section 27a. The annular space 27d also is connected by a conduit 36 to valve 31. Valve 31 includes an apertured part 31a which is rotatable so that conduit 36 can be placed in communication with a conduit 31b which is connected to a source of suction or with a conduit 31c which is open to the atmosphere.

Valve 32 is connected by conduits 32a and 32b to an opening 32c in the top part of the inner section 27b of member 27 and to an opening 32d in the bottom part of the space 27c. Valve 32 includes a part 32e having a passage 32f which is larger at one end than at its opposite end. Valve part 32e is rotatable so that either conduit 32a alone or both conduits 32a and 32b may be placed in communication with a conduit 32g which is open to the atmosphere.

When a cabinet 10 is to be formed, the peripheral edge of the thermoplastic sheet 22 is clamped between the frame parts 25a and 25b and heated to an elevated softening temperature. This may be accomplished in a suitable heating oven (not shown) for uniformly heating both sides of the sheet and allowing the sheet to sag during heating. When the sheet 22 has been heated to the desired softening temperature and has assumed a shape like that shown in FIG. 1, the frame 25 and sheet 22 clamped thereto are removed from the heating oven and fixed to the top edge 23′ of support 23 in any suitable manner.

The top member 26 is then moved downwardly until its bottom edge 26a contacts the top surface of the heated and softened sheet 22, as shown in FIG. 1. The extent to which the sheet 22 sags when softened is important in order to obtain even distribution of the material in the inner liner 11 and outer shell 12 and front connecting wall 21 therebetween. If the desired sagging of the softened thermoplastic sheet 22 is not effected during heating, it may be desirable to subject the underside of the sheet, which defines the top wall of the space 24 in FIG. 1, to a vacuum. This may be accomplished by rotating part 31a of valve 31 to place conduit 36 in communication with conduit 31b which is connected to a source of suction. In this way the final shape of the sheet 22 may be nicely controlled before the actual drawing of the sheet is started.

In FIG. 1 it will be seen that valves 30 and 32 are closed while valve 31 is operable to place the space 24 in communication with conduit 31b which is connected to a source of suction. As the softened sheet 22 continues to sag downward, movement is imparted to the member 26 so its bottom edge 26a will remain in contact with the sheet 22. When the sheet 22 has assumed its desired shape, the valves 30, 31 and 32 are adjusted to the positions illustrated in FIG. 2. In FIG. 2, the valve 30 places space 26c within the top member 26 in communication with conduit 30c which is open to the atmosphere, the valve 31 is closed, and the valve 32 places the opening 32c beneath the sheet 22 in communication with conduit 32g which is open to the atmosphere. With the valves 30, 31 and 32 in the positions shown in FIG. 2, extending upwardly from the bottom edge 26a of the top member 26 which stretches the outer section of the sheet extending upwardly from the bottom edge 26a of the top member to the clamp 25. When this occurs the section of the sheet 22 within the bottom edge 26a of the top member 26 is forced into the cavity of the member responsive to increase in air pressure in space 34 at the underside of the sheet 22.

The top member 26 is moved downwardly a vertical distance which effects the desired stretching of the section of the sheet about the bottom edge 26a of the top member. When this has been accomplished, the bottom member 27 is raised in the opening 24, the top and bottom members 26 and 27 being of such size that, when the bottom member 27 is moved to its uppermost position in FIG. 3, the top edge 27a' of its outer section 27a is flush with the top face of the bottom part 25b of clamp 25 when the bottom edge 26a of the top member 26 is at the immediate vicinity 27e of the base portion of the lower member 27 and separated therefrom by the thickness of the sheet. In FIG. 3 the outer and intermediate sections 22b and 22c, respectively, of the sheet 22 are at opposite sides of a sealing zone formed at 27e at which region the sheet is held between the top and bottom members 26 and 27.

The valves 30, 31 and 32 remain in the same position in FIG. 3 as in FIG. 2 when upward movement is being imparted to the bottom member 27. With this valve arrangement, the cavity 26c in the top member 26 is in communication with the atmosphere while the space 34', at the underside of the section of the sheet 22 extending from the region 27e to the top edge 27a' of the outer section 27a of the bottom member 27, is sealed and out of communication with both the atmosphere and the source of suction. Air at the underside of the sheet 22 may pass through the conduit 32a to the atmosphere through valve 32 during upward movement of the bottom member 27. What may be referred to as "air slip" is relied upon to allow trapped air to pass from sealed spaces at the underside of sheet 22 during upward movement of the bottom member 27. For example, air trapped in space 24' in FIG. 2 during upward movement of bottom member 27 will slip past point 27f into space 24" after sheet 22 contacts and engages point 27f. Similarly, air trapped in space 24" in FIG. 3 during upward movement of bottom member 27 will slip past point 27g into the space above opening 32c after sheet 22 contacts and engages point 27g.

After the bottom member 27 reaches its uppermost position shown in FIG. 3, mechanical drawing of the sheet 22 is completed and the sheet material has been distributed to assume a form approximating the form of the cabinet 10. The final forming of the sheet 22 is effected in apparatus 9 by vacuum. This is accomplished in FIG. 4 by adjusting valves 30 and 31 so that channels 33 and 35 will be in communication with conduits 30b and 31b and connected to a source of suction, and by adjusting valve 32 so that channels 37 and opening 32c will both be in communication with conduit 32g and open to the atmosphere.

With the valves 30, 31 and 32 in the positions shown in FIG. 4, the outer section of the sheet will be drawn outwards from one side of the sealing zone 27e toward the inner surface of the outer section 27a of the bottom member 27. Similarly, an intermediate section of the sheet at the opposite inner side of the sealing zone 27e will be drawn outwards from the upright portion of the bottom member 27 against the inner surface of the top member or plunger 26. If desired, suitable means (not shown) may be provided in the members 26 and 27 for heating these parts so that the sheet 22 will be maintained at a suitable elevated working temperature until the drawing is completed. The cabinet 10 thus formed from the sheet 22 is allowed to cool naturally or may be subjected to cooling in any suitable manner with the result that some shrinking of the cabinet 10 takes place. In this way, the cabinet may be withdrawn from the walls of the members 26 and 27 and removal of the cabinet 10 from the apparatus 9 is effected without difficulty. Removal of the cabinet 10 formed from the sheet 22 may be effected by compressed air which is applied at appropriate points of the cabinet.

The cabinet formed in the manner just described is characterized by the even distribution of material in the inner liner 11 and outer shell 12 and front connecting wall 21 therebetween. The drawn part of the sheet 22 extending downward from the region 38 in FIG. 4 is considerably thinner than the part of the sheet clamped between the frame parts 25a and 25b. The transition or change in thickness of the sheet 22 takes place along the top edge of the outer section 27a of the bottom member 27 between the frame 25 and the region 38. The outer flat peripheral edge portion 22a of the sheet 22 can be made sufficiently wide so that substantially all of the change in thickness of the sheet will take place in the portion 22a, whereby an even distribution of the sheet material will be effected in that part of the sheet extending downwardly from the region 38 in FIG. 4.

The cabinet 10 formed in accord with the invention is also characterized by the absence of the need for angle clearance. This is possible by reason of the particular construction and shape of the top and bottom members and the manner in which the final step of vacuum forming is effected after mechanical drawing has been completed. After cooling and shrinking of the double-walled cabinet formed takes place, the cabinet can be readily removed from the members 26 and 27 and clearance angles in the forming members are not necessary.

In view of the foregoing, it will now be understood that the heated thermoplastic sheet 22 is held at its periphery in a horizontal plane. When the top member 26 is moved downward from the position shown in FIG. 1 to that shown in FIG. 2, an outer zone of the sheet 22 is stretched in a first direction which is perpendicular to the horizontal plane to form an outer stretched section 22b which is inclined to the vertical and slants inward from the periphery of the sheet. When the bottom member 27 is moved upward from the position shown in FIG. 2 to that shown in FIG. 3, an inner zone of the sheet is stretched in the second opposite direction perpendicular to the horizontal plane to form an inner stretched section 22d at the underside of the closed end of the top member 26 which is essentially parallel to the horizontal plane and an intermediate stretched section 22c between the inner and outer sections 22d and 22b which is inclined to the vertical and forms a V with the outer section 22b and slants inward from the outer section 22b at the vicinity of the sealing zone at 27e at the closed end of the V and is disposed within the outer section 22b.

When the channels 33 and 35 are connected to a source of suction, the outer and intermediate sections 22b and 22c of the sheet 22 are subjected to fluid pressure differential to move them outward from the positions shown in FIG. 3 to the positions shown in FIG. 4. When this occurs the intermediate section 22c at one side of the sealing zone at 27e is moved by vacuum with respect to the outer section 22b in an outward direction from the vertical axis of the inner section 22d, thereby stretching the intermediate and inner sections 22c and 22d to respectively form the walls of the liner 11 which are perpendicular to the horizontal plane and the closed end of the liner which is parallel to the horizontal plane. Also, the outer section 22b at the opposite side of the sealing zone at 27e is moved by vacuum with respect to the intermediate section 22c in an outward direction from the vertical axis of the inner section 22d, thereby stretching the outer section 22b to respectively form the walls of the outer shell 12 which are parallel to the walls of the inner liner 11 and the connecting wall 21 between the walls of the liner and shell which is parallel to the horizontal plane. It will now be seen that the outer section 22b is moved outward by subjecting the bottom face of the sheet 22 to vacuum or the low fluid pressure of the fluid pressure differential, and the intermediate section 22c is moved outward by subjecting the opposite top face of the sheet 22 to vacuum or the low fluid pressure of the fluid pressure differential. Accordingly, the intermediate and inner sections 22c and 22d of the sheet 22 are moved in a direction from the outer surface of the inner upright portion of bottom member 27 to the inner surface of the cavity in the top member 26, as seen in FIG. 4.

Modifications of the invention which has been described will occur to those skilled in the art, and as it is desired that the invention not be limited to the particular arrangement set forth, it is intended in the claims to cover all those modifications which do not depart from the spirit and scope of the invention.

We claim:

1. In the method of forming from a sheet of thermoplastic material heated to an elevated softening temperature a double-walled receptacle including an inner liner defining a space having a closed end and walls extending therefrom toward an opening and an outer shell having walls which are spaced from the liner walls and a wall about the opening connecting the walls of the liner and outer shell, the improvement which comprises holding the heated thermoplastic sheet at its periphery in a horizontal plane, stretching inner and outer zones of the heated sheet in opposite directions perpendicular to the horizontal plane to form an outer stretched section which is inclined to the vertical and slants inward from the periphery of the sheet to a sealing zone and an inner stretched section which is essentially parallel to the horizontal plane and an intermediate stretched section between the inner and outer sections which is inclined to the vertical and forms a V with the outer section and slants inward from the outer section at the vicinity of the sealing zone at the closed end of the V and is disposed within the outer section, and subjecting the intermediate and outer sections to fluid pressure differential at opposite sides of the sealing zone to move them outward from the vertical axis of the inner section and stretch them to form the spaced walls of the liner and shell and connecting wall therebetween and the closed end of the liner, the outer section being moved outward by subjecting one face of the sheet at one side of the sealing zone to the low fluid pressure of the fluid pressure differential and the intermediate section being moved outward by subjecting the opposite face of the sheet at the other side of the sealing zone to the low fluid pressure of the fluid pressure differential.

2. The improvement set forth in claim 1 in which the inner and outer zones of the sheet are stretched mechanically in opposite directions perpendicular to the horizontal plane, and the outer section is moved outward by subjecting the one face of the sheet at the one side of the sealing zone to sub-atmospheric fluid pressure and the intermediate section is moved outward by subjecting the opposite face of the sheet at the other side of the sealing zone to sub-atmospheric fluid pressure.

3. In the method of forming from a sheet of thermoplastic material heated to an elevated softening temperature a double-walled receptacle including an inner liner defining a space having a closed end and walls extending therefrom toward an opening and an outer shell having walls which are spaced from the liner walls and a wall about the opening connecting the walls of the liner and outer shell, the improvement which comprises holding the heated thermoplastic sheet at its periphery in a horizontal plane, stretching an outer zone of the sheet in a first direction perpendicular to the horizontal plane to form an outer stretched section which is inclined to the vertical and slants inward from the periphery of the sheet to a sealing zone, stretching an inner zone of the sheet in the second opposite direction perpendicular to the horizontal plane to form an inner stretched section which is essentially parallel to the horizontal plane and an intermediate stretched section between the inner and outer sections which is inclined to the vertical and forms a V with the outer section and slants inward from the outer section at the vicinity of the sealing zone at the closed end of the V and is disposed within the outer section, and subjecting the intermediate and outer sections to fluid pressure differential at opposite sides of the sealing zone to move them outward from the vertical axis of the inner section and stretch them and the inner section to form the spaced walls of the liner and shell and connecting wall therebetween and the closed end of the liner, the outer section being moved outward by subjecting one face of the sheet at one side of the sealing zone to the low fluid pressure of the fluid pressure differential and the intermediate section being moved outward by subjecting the opposite face of the sheet at the other side of the sealing zone to the low fluid pressure of the fluid pressure differential.

4. The improvement set forth in claim 3 in which the outer and inner zones of the sheet are stretched mechanically in the first and second opposite directions, respectively, which are perpendicular to the horizontal plane, and the inner, intermediate and outer sections are stretched and the intermediate and outer sections are moved outward from the vertical axis of the inner section by subjecting the one face of the sheet at the one side of the sealing zone at the outer section to sub-atmospheric fluid pressure and by subjecting the opposite face of the sheet at the other side of the sealing zone at the intermediate section to sub-atmospheric fluid pressure.

5. In the method of forming from a sheet of thermoplastic material heated to an elevated softening temperature a double-walled receptacle including an inner liner defining a space having a closed end and walls extending therefrom toward an opening and an outer shell having walls which are spaced from the liner walls and a wall about the opening connecting the walls of the liner and outer shell, the improvement which comprises holding the heated thermoplastic sheet at its periphery in a horizontal plane, stretching an outer zone of the sheet in a first direction perpendicular to the horizontal plane to form an outer stretched section which is inclined to the vertical and slants inward from the periphery of the sheet to a sealing zone, stretching an inner zone of the sheet in the second opposite direction perpendicular to the horizontal plane to form an inner stretched section which is essentially parallel to the horizontal plane and an intermediate stretched section between the inner and outer sections which is inclined to the vertical and forms a V with the outer section and slants inward from the outer section at the vicinity of the sealing zone at the closed end of the V and is disposed within the outer section, subjecting the intermediate section to fluid pressure differential at one side of the sealing zone to move it outward from the vertical axis of the inner section and stretch it and the inner section to respectively form the walls of the liner which are perpendicular to the horizontal plane and the closed end of the liner which is parallel to the horizontal plane, and subjecting the outer section to fluid pressure differential at the other side of the sealing zone to move it outward from the vertical axis of the inner section and stretch it to respectively form the walls of the shell which are parallel to the walls of the liner and the connecting wall between the walls of the liner and shell which is parallel to the horizontal plane, the outer section being moved outward by subjecting one face of the sheet at the other side of the sealing zone to the low fluid pressure of the fluid pressure differential and the intermediate section being moved outward by subjecting the opposite face of the sheet at the one side of the sealing zone to the low fluid pressure of the fluid pressure differential.

6. In the method of forming from a sheet of thermoplastic material heated to an elevated softening temperature a double-walled receptacle including an inner liner defining a space having a closed end and walls extending therefrom toward an opening and an outer shell having walls which are spaced from the liner walls and a wall about the opening connecting the walls of the liner and outer shell, the improvement which comprises holding the heated thermoplastic sheet at its periphery in a horizontal plane, stretching an outer zone of the sheet in a first direction perpendicular to the horizontal plane to form an outer stretched section which is inclined to the vertical and slants inward from the periphery of the sheet to a sealing zone, stretching an inner zone of the sheet in the second opposite direction perpendicular to the horizontal plane to form an inner stretched section which is essentially parallel to the horizontal plane and an intermediate stretched section between the inner and outer sections which is inclined to the vertical and forms a V with the outer section and slants inward from the outer section at the vicinity of the sealing zone at the closed end of the V and is disposed within the outer section, subjecting the intermediate section to fluid pressure differential at one side of the sealing zone to move it with respect to the outer section in an outward direction from the vertical axis of the inner section and stretch it and the inner section to respectively form the walls of the liner which are perpendicular to the horizontal plane and the closed end of the liner which is parallel to the horizontal plane, and subjecting the outer section to fluid pressure differential at the other side of the sealing zone to move it with respect to the intermediate section in an outward direction from the vertical axis of the inner section and stretch it to respectively form the walls of the shell which are parallel to the walls of the liner and the connecting wall between the walls of the liner and shell which is parallel to the horizontal plane, the outer section being moved in the outward direction by subjecting one face of the sheet at the other side of the sealing zone to the low fluid pressure of the fluid pressure differential and the intermediate section being moved in the outward direction by subjecting the opposite face of the sheet at the one side of the sealing zone to the low fluid pressure of the fluid pressure differential.

7. In apparatus for forming from a sheet of thermoplastic material heated to an elevated softening temperature a double-walled receptacle including an inner liner defining a space having a closed end and walls extending therefrom toward an opening and an outer shell having walls which are spaced from the liner walls and a wall about the opening connecting the walls of the liner and outer shell, a support having an opening, the support having a surface upon which the periphery of the thermoplastic sheet is adapted to be supported in a horizontal plane over the opening, top and bottom members above and below the sheet which are vertically movable relative to one another, said members being constructed and arranged to mechanically stretch inner and outer zones of the sheet in opposite directions perpendicular to the horizontal plane responsive to relative movement of the top and bottom members toward one another to form an outer stretched section which is inclined to the vertical and slants inward from the periphery of the sheet to a sealing zone at which the sheet is held between the top and bottom members responsive to relative movement of the members toward one another and an inner stretched section which is essentially parallel to the horizontal plane and an intermediate stretched section between the inner and outer sections which is inclined to the vertical and forms a V with the outer section and slants inward from the outer section at the vicinity of the sealing zone at the closed end of the V, means for producing fluid pressure differential across the intermediate and outer sections at opposite sides of the sealing zone to move them outward from the vertical axis of the top and bottom members and stretch them to form the walls of the liner and shell and connecting wall therebetween and the closed end of the liner, one of said top and bottom members having a surface defining a cavity, and said means for producing fluid pressure differential including structure for subjecting one face of the sheet at one side of the sealing zone at the outer section to the low fluid pressure of the fluid pressure differential to move the outer section outward and for subjecting the opposite face of the sheet at the other side of the sealing zone at the intermediate section to the low fluid pressure of the fluid pressure differential to move the intermediate section outward against the wall of said cavity.

8. Apparatus as set forth in claim 7 in which the top member comprises an inverted cup-shaped part having a downwardly extending side terminating in an open bottom and the bottom member comprises an outer section of annular form and an inner section which includes a base portion and a narrower upright portion, the cavity being defined by the inner wall of the cup-shaped part, and the space between the outer section and upright portion of the bottom member forming a gap of annular form to receive the side of the top member, the sealing zone being formed responsive to relative movement of the top and bottom members toward one another at the region the lower end of the side of the inverted cup-shaped part bears against the part of the bottom member defining the bottom of the gap.

References Cited in the file of this patent

UNITED STATES PATENTS

| 2,007,548 | Sampson | July 9, 1935 |
| 2,282,423 | Kopitke | May 12, 1942 |
| 2,891,280 | Politis | June 23, 1959 |

FOREIGN PATENTS

| 638,135 | Great Britain | May 31, 1950 |

OTHER REFERENCES

Modern Plastics, vol. 34, June–August 1957, page 160, August Issue.